July 26, 1938.     D. L. RIOUX     2,124,829
LICENSE PLATE ILLUMINATION
Filed June 3, 1935
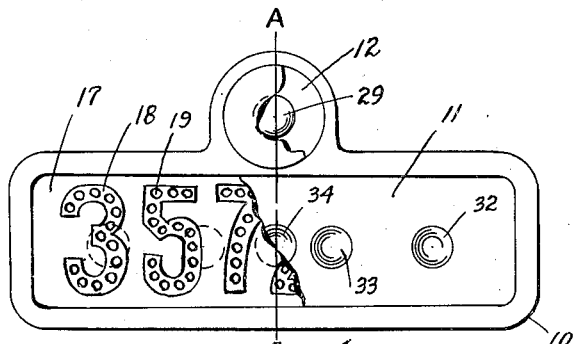
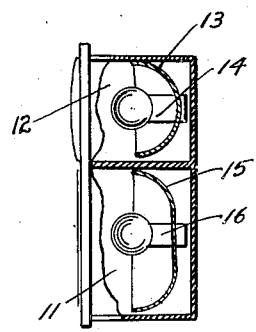
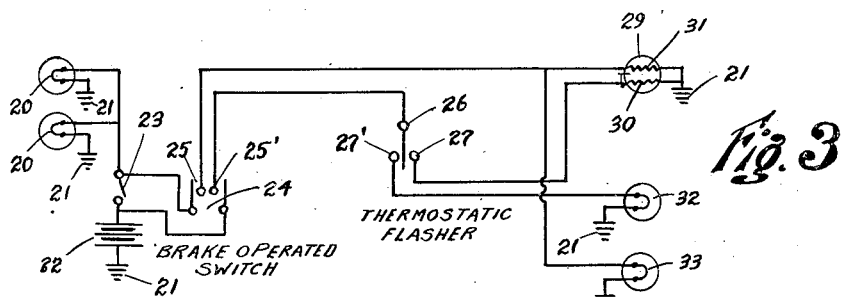
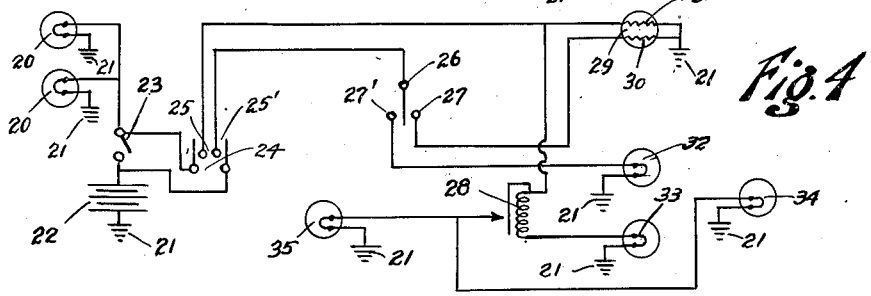
INVENTOR.
BY *Demcy L. Rioux*
*John F. Burg*
ATTORNEY.

Patented July 26, 1938

2,124,829

UNITED STATES PATENT OFFICE 2,124,829

LICENSE PLATE ILLUMINATION

Demcy L. Rioux, Green Bay, Wis.

Application June 3, 1935, Serial No. 24,781

2 Claims. (Cl. 177—329)

My invention relates to methods of illuminating license plates used on vehicles such as automobiles or the like, said license plates having the digits perforated or pierced, and lights with reflectors encased behind them.

An object of my invention is to afford visibility of the license numbers in the dark.

Another object of my invention is to supply a warning signal to indicate a change in operating condition of a moving vehicle by changing the color of the normal illumination of the license plate and to provide an intermittent flashing of the changed license plate illumination and that of the usual tail running signal when the brakes of the vehicle are applied.

Still another object of my invention is to provide a pilot signal that is automatically actuated when a filament in any one or all of the light bulbs in the arrangement become inoperative due to burning out or improper contact.

The invention is fully disclosed in the following specification of which the accompanying drawing is a part and in which the separate parts of my invention are designated by suitable reference characters in each of the several views, and in which:

Fig. 1 shows a fragmentary front view of a license container illustrated as a housing encasing a perforated license plate, a tail light and a plurality of light globes with reflectors behind them.

Fig. 2 is a cross sectional view of the device illustrated in Fig. 1 taken at a point A—A.

Fig. 3 is a diagrammatic illustration of the lighting arrangement without the pilot signal and trouble light; and Fig. 4 is a diagrammatic illustration of the lighting arrangement with a pilot signal and trouble light connected to the light bulbs illuminating the license only.

Similar characters of reference indicate corresponding parts throughout the several views and referring now to the same, 10 shows a housing or casing which may vary in design, and which in this instance consists of a compartment 11, encasing a license plate and a compartment 12 encasing a tail or parking signal. A reflector 13 is positioned behind the tail or parking lamp 14 and a reflector 15 behind the lamp 16 in the compartments 12 and 11, respectively.

A license plate 17 is shown with its digits 18 provided with a series of apertures 19 to allow the light to shine through. This arrangement as a whole is shown as a conventional design and may be varied to suit particular conditions and requirements. In the diagrammatic illustrations, the head lights are indicated at 20, and all ground connections at 21. A battery 22 is shown as the source of electric energy and a manual switch for the head lights at 23. A double acting switch 24 working in connection with the brake pedal (not shown), contacts one of its points 25 and 25' at a time. Point 25 has wires leading to a filament 31 of the tail or parking lamp 29 and to a white light 33 illuminating the license plate. The contact point 25' has a wire leading to a flasher switch 26, preferably of the thermo-expansive type having its movable switching element alternately cooperative with contact points 27 and 27' for intermittently flashing the filament 30 of the lamp 29 and a light bulb 32 preferably of the same color as the tail light, and placed behind the license plate in the compartment 11.

In Figure 4 a trouble light 34 and a pilot signal 35 are operated by a relay switch 28 which functions only when the filament of the lamp 33 burns out or the lamp becomes otherwise disconnected in which case the trouble light 34 and the pilot signal 35 are ignited.

In describing the operation of the method of illuminating the license plate, certain color lights are referred to. It is to be understood, however, that any arrangement or color scheme may be employed without in any way effecting the operativeness of the device.

In operation the device functions as follows: The battery 22 furnishing the electric energy ignites the head light bulb 20 when the switch 23 is closed. Normally the switch 24, connected to the brake pedal of the automobile or the like, contacts the point 25 thus igniting the filament 31 of the light bulb 29 which, for example, is colored red and acts as a tail light, and the light bulbs 33 which are white and illuminate the license plate by means of the reflectors 15 in the compartment 11. When the operator applies the brake, the contact 25 of the switch 24 will become inoperative and the contact 25' will be completed. This energizes the flasher switch 26 which intermittently contacts the points 27 and 27' thereby igniting the filament 30 in the red tail lamp 29 and the red lights 32 encased behind the license plate flashing the lamps 29 and 32 alternately as a warning signal that the vehicle is coming to a stop or has stopped, and as long as the brakes are kept in an applied position this flashing will continue. As soon as the pressure is released from the pedal, contact with the point 25' will again be released and a contact formed with the point 25 changing the illumination of the license plate back from red to white and eliminating the flashing.

In the event that any one or some of the light bulbs burn out the relay 28 will be brought into operation and a trouble light 34 encased behind the license plate in compartment 11, and of a green color for example, will be ignited informing the authorities that trouble has developed in the lighting arrangement of the automobile or the like. At the same time a pilot light 35, installed on the dash or any other convenient place of the automobile or the like, functioning with the trouble light 34 will ignite and warn the driver of trouble in his lighting arrangement.

It is manifest to anyone familiar with the night driving that illuminated license plates on the front and rear of an automobile or the like, or even on the rear only, will unquestionably provide better identification in the dark and to have an intermittent flashing of tail light and license plate acting as a danger signal when the automobile or the like is coming, or has come, to a stop, will obviously attract the attention of other drivers and eliminate pending danger.

Having thus explained the nature of my invention and described various ways of constructing and using same, although without attempting to set forth all of the forms in which it may be constructed or all of the modes of its use, what I claim and desire to secure by Letters Patent in the United States, is:

1. In an electrical signal system for vehicles, a current source, a tail signal, a license plate, light sources normally illuminating said tail signal and said license plate, other light sources cooperative with said tail signal and said license plate, the other light source for said license plate being colored red to correspond to that of the tail signal, the light source for said tail signal being a single multi-filament lamp bulb with one filament connected in circuit with the light source normally illuminating said license plate and another filament with the other light source for illuminating the license plate, and a switch means operable with the brake pedal to flash the said other light sources during the actuation of the brake pedal to apply the vehicle brakes.

2. In an electrical signal system for vehicles, a current source, a tail signal, a license plate having its digits perforated, light sources normally illuminating said tail signal and said license plate from in rear thereof, other light sources cooperative with said tail signal and said license plate, the other light source for said license plate being colored red to correspond to that of the tail signal, the light source for said tail signal being a single multi-filament lamp bulb with one filament connected in circuit with the light source normally illuminating said license plate and another filament with the other light source for illuminating the license plate, and a switch means operable with the brake pedal to flash the said other light sources during the actuation of the brake pedal to apply the vehicle brakes.

DEMCY L. RIOUX.